Figure 1:
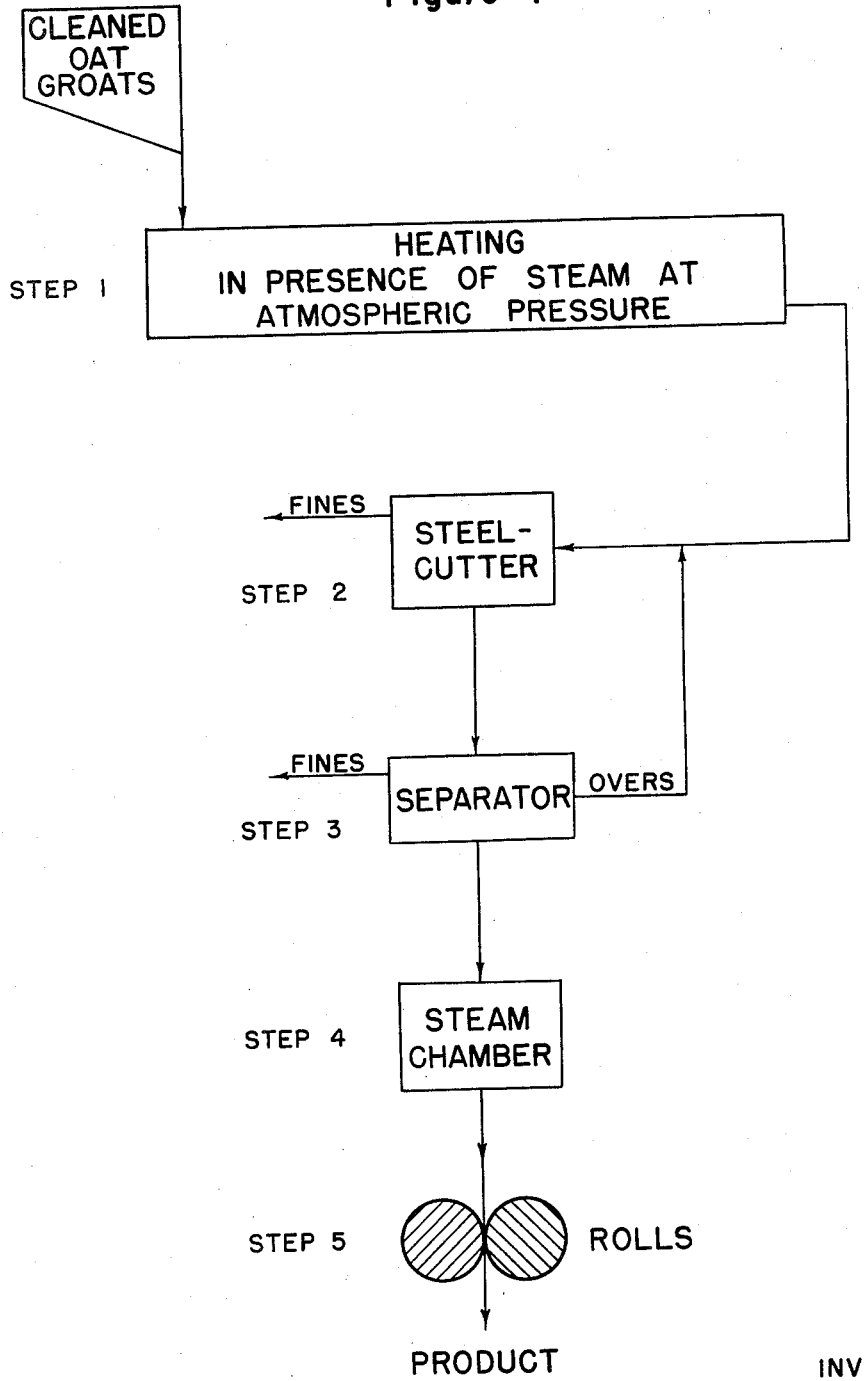

Aug. 4, 1959 W. G. DALE ET AL 2,898,210
PROCESS FOR PRODUCING ROLLED OATS
Filed April 1, 1957 2 Sheets-Sheet 1

INVENTORS
Walter G. Dale
Edward F. Lilly
BY
ATTORNEY

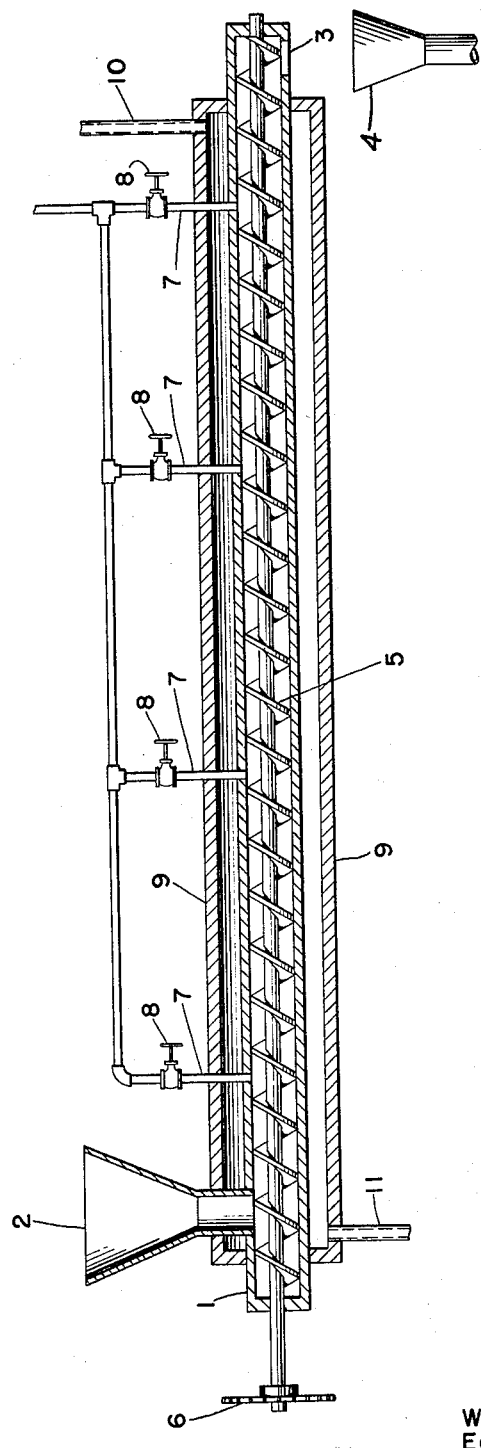

2,898,210
PROCESS FOR PRODUCING ROLLED OATS

Walter G. Dale, Wauconda, and Edward F. Lilly, East Dundee, Ill., assignors to The Quaker Oats Company, Chicago, Ill., a corporation of New Jersey Application April 1, 1957, Serial No. 649,763

5 Claims. (Cl. 99—80)

This invention relates to oats processing and more particularly to an improved process for preparing an instant or quick-cooking rolled-oats cereal product for human consumption.

Rolled oats for breakfast cereal use are generally of two types, the old-fashioned type and the quick-cooking type. To prepare the old-fashioned type, cleaned and graded whole oats are given a drying treatment which reduces their moisture content from about 10–12% to about 6–8%. The dried whole oats are then dehulled between Carborundum stones or by passage through impact dehullers. The resulting groats (dehulled oats) are then softened with live steam and passed between large steel rolls which flatten the groats into rather large flakes. To prepare the quick-cooking type of rolled oats the same procedure is employed except that the oat groats from the dehulling operation are subjected to steel cutting in a rotary-type granulator and passed through a separator to remove fines and oversized particles prior to the softening with steam and flaking with steel rolls.

Although both of these rolled oats products have achieved great popularity their use in the preparation of hot breakfast cereals is not without disadvantages. The old-fashioned type which has special appeal to some consumers requires at least 5 minutes of cooking in boiling water. The quick-cooking type, made up of smaller, thinner flakes, is cooked more easily but nevertheless requires at least one minute cooking in boiling water. Both types of rolled oats have the disadvantage of requiring cooking utensils apart from the cereal bowl used in serving the hot porridge. This is regarded as less than desirable by some modern-day consumers ever seeking quicker-cooking or even instant-type foods which can be prepared in the dish from which they are to be consumed. As a result, a number of consumers in recent times have turned to ready-prepared dry cereals, thereby depriving themselves of the more nutritious hot oat cereals.

Attempts have been made to produce instant-type oat cereals by processes involving conventional pre-cooking. However, such products, after drying and packaging, have an unsatisfactory shelf life, rapidly developing a rancid flavor.

It is an object of this invention to provide an improved process for preparing rolled oats which are quicker cooking than any heretofore known.

Another object of the invention is to provide a process for producing rolled oats which can be prepared for table use by the mere addition of hot water.

A further object of the invention is to provide a process for producing a rolled oats product which can be prepared for table use in the bowl from which it is to be consumed.

Another object of the invention is to provide a process for producing an instant-type rolled oats product having a satisfactory shelf life.

In accordance with the invention, these objects are accomplished by a special heat treatment of the dehulled oats prior to the conventional steps of softening the groats with steam and then flaking by passage between steel rolls. This special heat treatment is effected by heating the groats at a temperature greater than 212° F. in the presence of steam at about atmospheric pressure.

The starting material employed is whole oats which may be given a conventional cleaning treatment in a cleaning house to remove chaff as well as take out wheat, light oats and other unwanted grains and extraneous material.

From the cleaning house the whole oats may go to a drying house which is mainly a series of steam-jacketed drying pans through which the oats must pass. This drying step makes possible easier removal of the hulls in the following step in which the dried whole oats are passed between milling stones to split the oat kernels or groats from their hulls. However, the drying step is preferably omitted, the cleaned, green whole oats preferably being passed directly to impact dehullers which remove the hulls without benefit of previous drying.

For a more complete understanding of this invention reference will now be made to the accompanying drawings in which—

Figure 1 is a schematic flow diagram of a preferred embodiment of the invention, and Figure 2 is a longitudinal sectional view of a preferred apparatus employed in effecting the aforementioned special heat-treatment of the oat groats.

In the embodiment of the invention illustrated by Figure 1, cleaned oat groats, preferably green groats, are heated in the presence of steam at atmospheric pressure (step 1). As the groats emerge from the heat-treatment in this step their final bulk temperature is between about 205° F. and about 260° F., preferably between 220° F. and about 255° F. Final bulk temperature is defined as that temperature reading obtained when the product of step 1 is caught in a container, such as a glass jar, provided with a thermometer. Since for practical reasons the temperature reading cannot be obtained at the instant of completion of step 1, a slight cooling of the product occurs so that the minimum final bulk temperature specified above (205° F.) is somewhat lower than the minimum temperature of heating specified in step 1 above (greater than 212° F.).

The treated groats from step 1 are next cut into a plurality of sections in a steel cutter or rotary type granulator (step 2). Fines are removed by aspiration.

The steel-cut groats are then passed to a separator, such as a disc separator or apron grader, which effects recycling of the oversized material back to the steel cutter and passes on for further processing steel-cut groats of the proper size (step 3). Here again, fines are removed by aspiration.

The sized product of step 3 is next passed to a steam chamber (step 4). The product is here exposed to steam at atmospheric pressure for a time sufficiently long to soften the steel-cut groats.

The softened product of step 4 is then passed between conventional-type steel rolls to produce flakes of rolled oats which we have found to be of instant-type cooking quality requiring only the addition of hot water to produce a ready-to-eat porridge.

In another embodiment of the invention steps 2 and 3 are eliminated. The resulting product is a novel quick-cooking old-fashioned type of rolled oats which can be cooked to a porridge with boiling water in about 1 or 2 minutes. Heretofore, such large, old-fashioned type rolled oat flakes required about 5 minutes of cooking time.

In Figure 2 is illustrated a preferred type of apparatus for effecting the special heat-treatment described as step 1 in Figure 1. In the apparatus shown a cylinder 1 is provided having an upper opening in one end provided with a funnel 2 and a lower opening 3 at the other end above a receiving funnel or hopper 4. A screw conveyor 5 is rotatively mounted within the cylinder 1 and driven at a regulated rate by means operatively associated with a gear wheel 6 fixed to one end thereof. Steam conduits 7 provided with valves 8 enter the upper half of cylinder 1, preferably in staggered relation to each other. The cylinder 1 is almost completely enclosed by an annular steam jacket 9. A steam conduit 10 enters the upper part of one end of the steam jacket 9. Another conduit 11 enters a lower end of the steam jacket for removal of water of condensation.

To operate the apparatus according to the invention steam of about 20–200 pounds per square inch gauge pressure is admitted to the steam jacket 9 through the conduit 10. By this means the cylinder 1 which serves as a heating element as well as a treatment chamber is heated to a temperature between about 260° F. and about 390° F., preferably about 300° F. to about 365° F. Valves 8 are then opened to admit low-pressure steam into the cylinder 1 and thus provide an atmosphere of steam, the steam pressure within the open-ended cylinder 1 being substantially no greater than atmospheric pressure. The screw conveyor 5 is then caused to rotate at a regulated rate of rotation by means of the gear wheel 6 and conventional means not shown for driving the gear wheel 6 at a regulated rate. Cleaned oat groats are next fed into the funnel 2 and conveyed through the cylinder 1 by the screw conveyor 5 to the opening 3 from which they drop into the funnel 4. Thereafter the groats are further processed as described in the aforementioned steps 2, 3, 4 and 5. The screw conveyor 5 is preferably driven at such a rate of rotation as to provide a holding time for the groats within the cylinder 1 of about 4 minutes to about 40 minutes, preferably about 4 minutes to about 15 minutes.

It has been found that the aforementioned special heat treatment, either as described for step 1 of Figure 1 or as described for Figure 2 desirably effects a reduction in moisture content of the groats between about 10% and about 40% by weight of the groats (moisture content determined by Air-Oven Method, Methods of Analysis of A.O.A.C., 7th edition, page 192). Furthermore, the same treatment increases the bulk volume of the groats between about 8% and about 40%, preferably between about 15% and about 30%, bulk volume being defined as the milliliters of space occupied by a 100 gram sample of the groats when poured into a graduated container.

The invention will be further illustrated but is not limited by the following examples in which instant-type rolled oats were produced employing the apparatus of Figure 2 for the special heat-treatment of the invention and conventional oat-milling equipment for all other operations.

*Example 1*

Steam was admitted to the steam jacket 9 and maintained at 100 p.s.i.g. (pounds per square inch gauge). The valves 8 were then opened to inject steam into the cylinder 1. The inlet line providing the injected steam registered 3 p.s.i.g. but since the cylinder 1 is not completely enclosed the injected steam pressure was substantially atmospheric pressure. The screw conveyor was next started and its rotation maintained at a rate providing a holding time of about 9 minutes. Cleaned, green groats having a moisture content of 10.9% by weight were fed through the funnel 2 into the cylinder 1 and conveyed therethrough until they dropped from the opening 3 into the funnel 4. The treated groats obtained from the opening 3 were found to have a moisture content of 7.6% by weight, a decrease of about 30%. Their bulk volume was found to have increased about 25%. Their final bulk temperature was found to be 250° F. The treated groats were then passed in turn through a steel cutter, a separator, a steam chamber wherein the steam pressure was substantially atmospheric pressure, and finally between steel rolls.

*Example 2*

The same procedure as described in Example 1 was used with the exception that the green groats which entered the apparatus of Figure 2 had a moisture content of 10.3% by weight and a bulk volume of 142.9 ml. (milliliters) and the holding time was about 7 minutes. The treated groats from the opening 3 had a moisture content of 8.2% by weight, a bulk volume of 175 ml. and a final bulk temperature of 240° F.

*Example 3*

The procedure of Example 1 was again repeated with the exception that the green groats entering the apparatus of Figure 2 at a moisture content of 10.4% by weight and a bulk volume of 142.7 ml.; and, furthermore, the steam pressure on the jacket 9 was 150 p.s.i.g., and the holding time was 4–5 minutes. The treated groats exiting from the opening 3 had a final bulk temperature of 225° F., a moisture content of 8.3% by weight, and a bulk volume of 180 ml.

*Example 4*

The procedure of Example 1 was again repeated with the exception that the green groats entering the apparatus of Figure 2 had a moisture content of 9.4% and a bulk volume of 140 ml.; the steam pressure on the jacket 9 was 50 p.s.i.g., and the holding time was from 12–15 minutes. The treated groats emerging from the opening 3 were found to have a final bulk temperature of 230° F., a moisture content of 7.5% and a bulk volume of 252 ml.

Porridges were made from each of the rolled oats products produced in Examples 1, 2, 3 and 4 using the following recipe: Place ⅓ cup of oats in bowl. Sprinkle with salt. Add ½ cup boiling water and let stand without stirring until water is absorbed (about 45 seconds). Stir and let stand approximately 30 seconds before serving. In each case a sufficiently cooked, edible porridge of wholesome flavor was obtained.

Samples of the rolled oats products of Examples 1, 2, 3 and 4 were also packaged and stored for 10 months at 100° F. and 50% relative humidity. Porridges prepared from these stored samples, using the aforementioned recipe, also had a wholesome flavor and were otherwise satisfactory.

From the above description it is apparent that the rolled oats products produced according to the invention are quicker cooking than any rolled oats products heretofore known, Furthermore, the process of the invention produces rolled oats of good shelf life which can be prepared for table use by the mere addition of hot water. Accordingly, the resulting product has reached an ultimate of convenience for the housewife in that ordinary cooking utensils need not be used, the porridge being prepared in the bowl from which it is to be consumed.

We claim:

1. In a process for producing rolled oats in which oat groats are steamed and then flaked, the improvement comprising first heating the groats in the presence of steam at about atmospheric pressure at a temperature of about 260° F. to about 390° F. to attain a final measurable bulk temperature of about 205° F. to about 260° F. in about 4 to about 40 minutes.

2. A process for producing instant-type rolled oats from green groats comprising heating said groats in the presence of steam at about atmospheric pressure at a temperature of about 300° F. to about 365° F. to attain a final measurable bulk temperature of about 220° F. to about 255° F. in about 4 to about 15 minutes, steel-cutting the heat-treated groats, steaming the steel-cut groats, and flaking the steamed steel-cut groats.

3. The process according to claim 2 wherein said heating reduces the moisture content of the groats between about 10% and about 40% by weight.

4. The process according to claim 2 wherein said heating increases the bulk volume of the groats between about 8% and about 40%.

5. The process according to claim 2 wherein said heating increases the bulk volume of the groats between about 15% and about 30%.

References Cited in the file of this patent

UNITED STATES PATENTS

| | | |
|---|---|---|
| 184,837 | Chichester | Nov. 28, 1876 |
| 1,435,794 | Beck | Nov. 14, 1922 |

FOREIGN PATENTS

| | | |
|---|---|---|
| 133,886 | Great Britain | Oct. 23, 1919 |

OTHER REFERENCES

"The Chemistry and Technology of Food and Food Products," vol. III, 1951, by Jacobs. Published by Interscience Publishers, Inc., New York, pp. 2041 to 2043 relied on.